(12) United States Patent
Kerdraon et al.

(10) Patent No.: US 8,781,529 B2
(45) Date of Patent: Jul. 15, 2014

(54) METHOD AND DEVICE FOR MANAGING APPLICATIONS OF A MOBILE TERMINAL

(75) Inventors: Alan Kerdraon, Caen (FR); Thierry Morel, Tourville sur Odon (FR); Olivier Briot, Saint Meloir des Ondes (FR); Jérôme Legros, Caen (FR); Hauke Meyn, Krempermoor (DE)

(73) Assignees: Frence Telecom, Ba Eindhoven (NL); NXP B.V., Eindhoven (NL)

( * ) Notice: Subject to any disclaimer, the term of this patent is extended or adjusted under 35 U.S.C. 154(b) by 1050 days.

(21) Appl. No.: 12/083,816

(22) PCT Filed: Oct. 16, 2006

(86) PCT No.: PCT/FR2006/051036
§ 371 (c)(1),
(2), (4) Date: Feb. 26, 2009

(87) PCT Pub. No.: WO2007/045790
PCT Pub. Date: Apr. 26, 2007

(65) Prior Publication Data
US 2009/0215489 A1 Aug. 27, 2009

(30) Foreign Application Priority Data
Oct. 17, 2005 (FR) ...................................... 05 10575

(51) Int. Cl.
*H04B 1/38* (2006.01)
(52) U.S. Cl.
USPC .......................................... 455/558; 455/434
(58) Field of Classification Search
USPC ........................................................ 455/558
See application file for complete search history.

(56) References Cited

U.S. PATENT DOCUMENTS

| | | | |
|---|---|---|---|
| 6,430,599 B1 | 8/2002 | Baker et al. | |
| 7,206,820 B1 * | 4/2007 | Rhoads et al. | 709/217 |
| 7,269,445 B2 * | 9/2007 | Natsuno et al. | 455/558 |
| 2002/0065712 A1 | 5/2002 | Kawan | |
| 2002/0199027 A1 * | 12/2002 | Huber | 709/310 |
| 2004/0186918 A1 * | 9/2004 | Lonnfors et al. | 709/250 |
| 2004/0232247 A1 | 11/2004 | Tsunoda et al. | |
| 2005/0006461 A1 | 1/2005 | Shenker et al. | |
| 2005/0127166 A1 | 6/2005 | Minemura | |
| 2006/0046720 A1 * | 3/2006 | Toropainen et al. | 455/434 |
| 2007/0226645 A1 * | 9/2007 | Kongqiao et al. | 715/781 |
| 2009/0098875 A1 * | 4/2009 | De Beer | 455/445 |
| 2009/0215489 A1 | 8/2009 | Kerdraon et al. | |

FOREIGN PATENT DOCUMENTS

| | | | |
|---|---|---|---|
| EP | 275510 A2 * | 7/1988 | G07F 7/10 |
| FR | 2 857 193 | 1/2005 | |
| JP | 2000-011109 | 1/2000 | |

(Continued)

OTHER PUBLICATIONS

Meckler et al., "Java and Inter-Applet Communication: A Communication Mechanism Using the Java Hash Table", Dr. Dobb's Journal, M&T Publications, vol. 22, No. 10, pp. 46, 48, 50-53, 103, Oct. 1997.

*Primary Examiner* — Ajibola Akinyemi
(74) *Attorney, Agent, or Firm* — Cozen O'Connor

(57) ABSTRACT

A method and system for managing a set of applications stored on a mobile terminal, comprising an access to said set of applications enabling at least one specific function to be accessed by at least one application using an application manager.

9 Claims, 12 Drawing Sheets

(56) References Cited

FOREIGN PATENT DOCUMENTS

| JP | 2004-272400 | 9/2004 |
| JP | 2005-202914 | 7/2005 |
| JP | 3-703098 | 10/2005 |
| JP | 2006-072956 | 3/2006 |
| WO | WO 98/32089 | 7/1998 |
| WO | WO 03/069472 | 8/2003 |
| WO | WO 2005/020604 | 3/2005 |

* cited by examiner

US 8,781,529 B2

METHOD AND DEVICE FOR MANAGING APPLICATIONS OF A MOBILE TERMINAL

RELATED APPLICATIONS

This is a U.S. National Phase Application under 35 USC 371 of International Application PCT/FR2006/051036, filed on Oct. 16, 2006.

This application claims the priority of French application no. 05/10575 filed Oct. 17, 2005, the entire content of which is hereby incorporated by reference.

FIELD OF THE INVENTION

The invention relates to mobile telecommunications and more particularly to managing applications in a mobile terminal.

BACKGROUND OF THE INVENTION

At present users of mobile telephone or smart phone type mobile terminals are confronted with an ever richer offer of services. Over and above standard telephone services, users are offered diverse and varied services such as messaging, audio and video streaming, games, content downloading, calendar, etc. These services are accessible locally on the mobile terminal, via a mobile network (GSM, GPRS, UMTS, etc.) or via a near-field connection, for example using exchange protocols such as IrDA, Bluetooth, or RFID.

These services rely on applications that are stored either directly in the mobile terminal or in microchip cards or smart cards. A service can call on one or more applications.

For example, in the Java system, an application in the mobile terminal corresponds to a mobile information device profile applet (MIDlet), i.e. a Java application that can be executed on a Java mobile. Thus the presentation part (e.g. Java MIDlet) that manages the man-machine interface (MMI) of the application is specific to the mobile terminal on which it is executed. It is responsible for the graphical interface of the application and for managing access to certain resources of the mobile terminal or network (for example GSM call set-up, WAP server connection, SMS message sending, etc.). Note that a MIDlet is generally a specific applet, which does not require integrating a new application into the mobile terminal.

Moreover, when an application is in a smart card type microchip card, it corresponds to a Cardlet (Java Card applet). Under such circumstances, the business part, which manages the application data, e.g. the Java Cardlet, can be stored either in a SIM card of the mobile terminal or in a dedicated component, for example a Smart MX component.

It is important to note that the deployment and management of these applications, also referred to as "cards", have not been standardized and so different card providers offer their own solutions,. in particular in terms of management. Thus from the user's point of view the multiplicity of cards or applications increases the complexity of managing the applications.

OBJECT AND SUMMARY OF THE INVENTION

One aspect of the present invention provides a method of managing a set of applications stored in a mobile terminal, including access to said set of applications, enabling at least one application of said set to access a particular function by means of an applications manager. By application set is meant one or more applications.

Thus the method of the invention offers unique access to a plurality of applications stored in the mobile terminal.

According to a first feature of the invention the method further includes storing information relating to said at least one application in storage means.

Thus a list of applications installed in the mobile terminal and any other information relating to those applications can be accessed simply and quickly.

According to a second feature of the invention the method further includes storing in a transaction log information relating to transactions effected via the mobile terminal by the user.

Thus users can reconstruct all operations effected via their mobile terminal.

According to a third feature of the invention the method further includes administration by a security module of security data relating to said at least one application.

This provides secure management of the applications either overall or one by one.

To provide a particular service, said at least one application advantageously recovers parameters relating to said at least one application from the applications handler.

This provides a simple way for users to receive a service.

The method further includes storing a new application in the storage means of the mobile terminal.

Thus storing the new application offers that application access to all the particular functions.

The method advantageously further includes generating a unified view of said set of applications.

Thus the method of the invention offers mobile terminal users an overview enabling them to access simply and quickly services corresponding to the plurality of applications installed in the mobile terminal.

Generating a unified view includes the following steps:
  accessing a graphical user interface; and
  exchanging information relating to said at least one application with the applications handler.

Thus this method recovers, manages, and displays information relating to applications in a simple and intuitive way.

Another aspect of the invention is directed to a system for managing a set of applications stored in a mobile terminal, including an applications handler comprising access means to said set of applications enabling at least one application of said set to access a particular function.

According to one feature of the invention the applications handler comprises storage means for storing information relating to said at least one application.

According to another feature of the invention the applications handler comprises a transaction log for storing information relating to transactions effected by users via their mobile terminal.

According to a further feature of the invention the applications handler comprises a security module for administering security data relating to said at least one application.

The system advantageously includes a centralized applications manager connected to the applications handler for generating a unified view of said set of applications.

The centralized applications manager includes:
  a graphical user interface; and
  a connector for exchanging information relating to at least one application from said set of applications between the graphical user interface and the applications handler.

Another aspect of the invention is directed to a mobile terminal including a management system with the above features.

Another aspect of the invention is directed to a computer program including code instructions for executing the method having the above features of managing a set of applications stored in a mobile terminal when the program is executed by the management system of the mobile terminal.

DETAILED DESCRIPTION OF THE DRAWINGS

Figure 1:
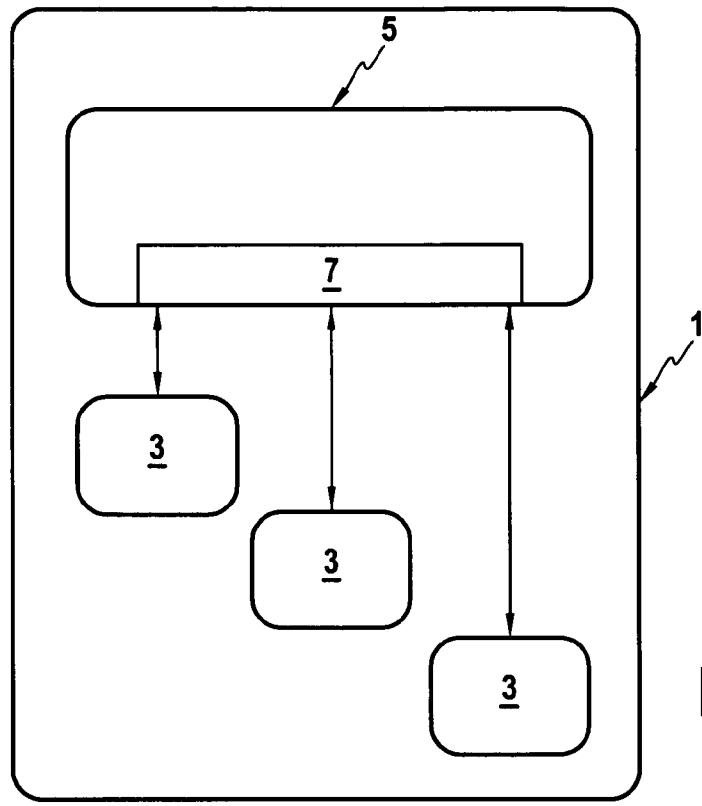
FIG. 1 is a diagram showing a system according to an embodiment of the invention for managing a mobile terminal having a plurality of applications.

FIG. 1 shows one example of a system 1 of the invention for managing a set of applications 3 stored on a mobile terminal. By set of applications is meant one or more applications. This system includes an applications handler 5 for managing at least one application 3. The applications handler 5 includes means 7 for accessing the set of applications 3 enabling said at least one application 3 to access at least one particular function. Thus the access means 7 provide common access to a set of applications 3 installed in the mobile terminal for normalizing management of those applications 3 and facilitating integration of a new application. The access means 7 can consist of Java Card applications, for example.

Figure 2:
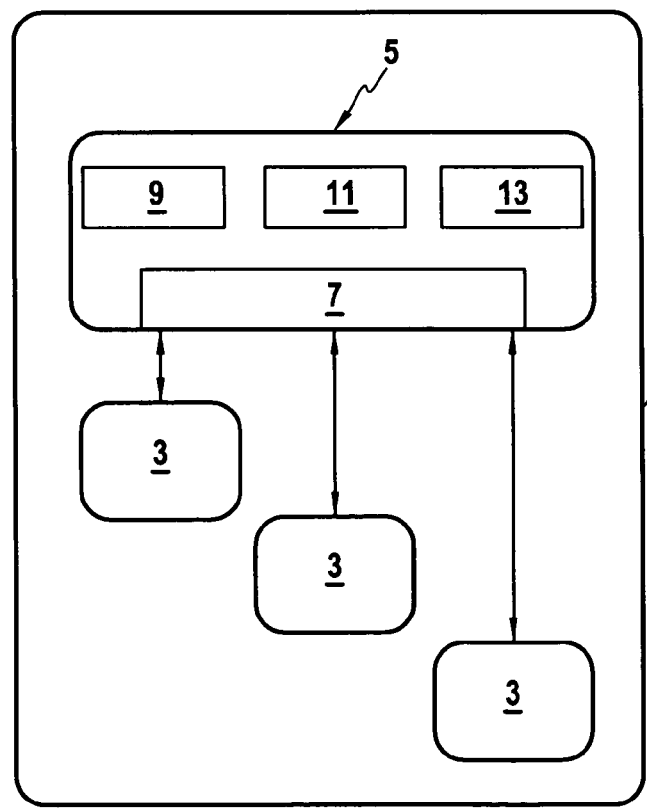
FIGS. 2 and 3 are diagrams showing details of FIG. 1.

Furthermore, FIG. 2 shows that the applications handler 5 includes storage means 9, also referred to as the applications repository, and where appropriate a transaction log 11 and a security module 13.

Thus the storage means 9 store information relating to any application 3 already installed in the mobile terminal or any new application to be integrated into the mobile terminal. For example, the storage means 9 can include a list of applications 3 installed in the mobile terminal and parameters associated with each of those applications 3. An application can be managed by the applications handler 5 when it is stored in the storage means 9.

The transaction log 11 stores information relating to transactions effected by the user via the mobile terminal. That information can include transaction start and end times of day and the result of the transaction.

Likewise, the security module 13 administers security data including security keys and codes relating to any application 3, for example.

Figure 3:
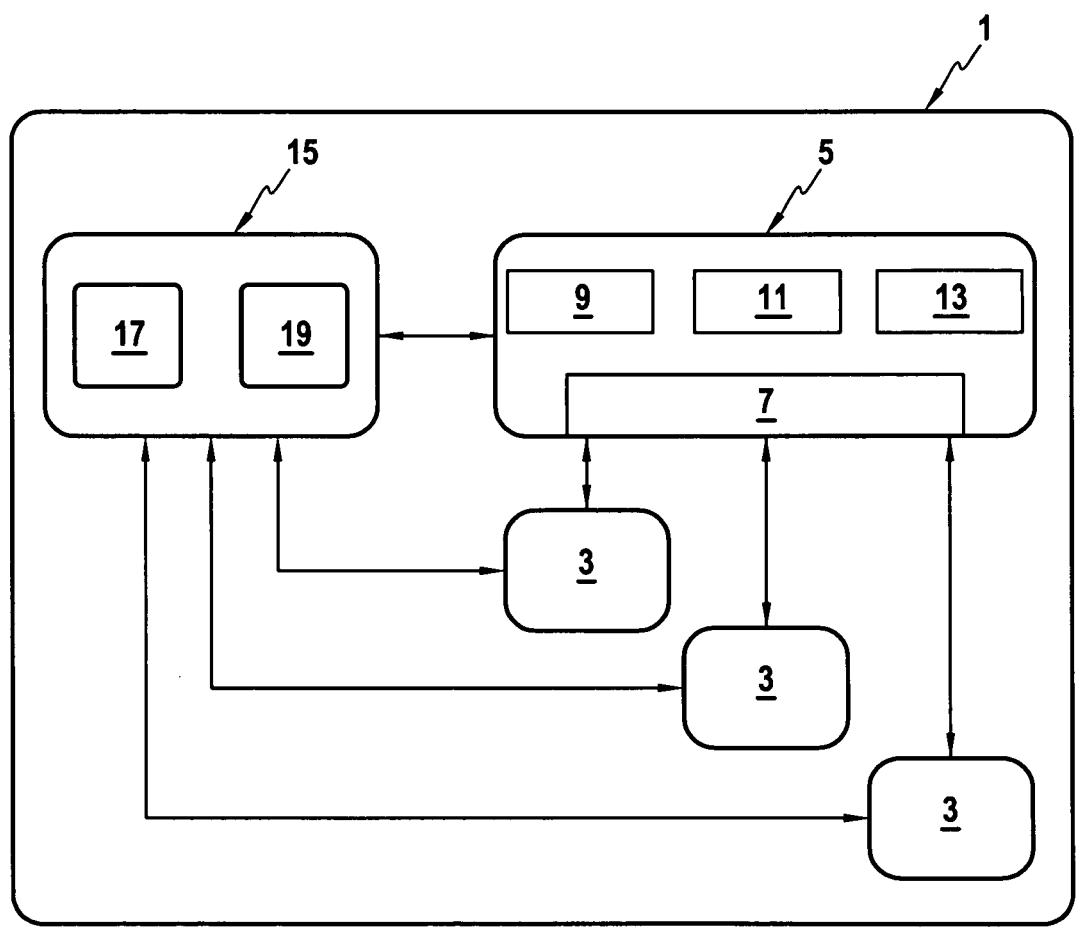

FIG. 3 shows the FIG. 1 system in more detail, and shows that the management system 1 includes a centralized applications manager 15 connected to the applications handler 5. The centralized applications manager 15 generates a unified view of said at least one application 3 managed by the applications handler 5.

More particularly, the centralized applications manager 15 includes a graphical user interface (GUI) 17 and a connector 19. This connector, which can take the form of a Java MIDlet, is used to exchange information relating to said at least one application 3 between the graphical user interface 17 and the applications handler 5. It recovers and updates information relating to the applications 3. This connector 19 therefore effects protocol adaptation using protocols based for example on Java Specification Request 177 (Security and Trust Services API for J2ME) to dialogue with a SIM card or based on Java Specification Request 257 (Contactless Communication API) to manage contactless communication.

The graphical user interface 17 of the centralized applications manager 15 therefore offers the user the graphical interfaces needed to manage the applications 3 and to construct a unified view of those applications 3. This view is constructed by the connector 19 in conjunction with the applications handler 5, which offers a set of particular functions.

In this example the access means 7 of the applications handler 5 offer said at least one application 3 or the centralized applications manager 15 at least one particular function from a set of particular functions including:

selecting an application 3 based on its identifier or index;

storing an application 3 and the identifier of that application in the storage means 9;

obtaining the identifier of an application 3 from its index;

updating certain parameters of an application 3 concerning, for example, the name of the application 3, the activation flag for the security code (PIN) of the application 3 or the activation flag for the application 3 itself;

recovering these parameters concerning the name of the application 3, the activation flag for the security code (PIN) of the application 3 or the activation flag for the application 3;

recovering business data of an application 3, for example a client identifier, the validity date of the application 3, the available credit;

recovering transactions relating to an application using the transaction log;

verifying a security code, for example the PIN or an authentication key, using the security module;

modifying a security parameter such as a PIN;

unlocking a security code such as a PIN;

authenticating an external device, for example when setting up a secure channel;

storing a transaction;

recovering a security code, for example a PIN.

The storage means 9 can include, for a given application 3, the index of the application, the identifier of the application, the name of the application, the PIN protection state of the application (for example, a "true" state signifies obligatory PIN verification and a "false" state signifies no PIN verification), and the activation state of the application (for example, a "true" state signifies an activated and therefore usable application and a "false" state signifies a deactivated and therefore unusable application).

The transaction log 11 can contain information on all transactions effected by the user via the mobile terminal. A record of a transaction can be defined by the identifier of the application and significant data of the transaction (for example, the transaction start time of day, the transaction end time of day, the amount of credit used, the amount of credit remaining, the result of the transaction, etc.).

Moreover, the security module 13 contains and administers the security code(s) (e.g. PIN(s)) of the applications, the maximum number of attempts authorized before blocking, the number of successive failed attempts, and the PIN unblocking key (PUK).

Thus the applications handler 5 can manage the parameters of the applications 3 (name, activation flag, etc.), storing the applications 3, and the record of transactions relating to the use of the applications 3. It also offers business data consultation functions specific to each application, security parameter (PIN, security code verification, PIN unblocking) management functions, activation flag reading functions or transaction storage functions. In other words, the applications handler 5 knows the applications 3 installed in the mobile terminal and their parameter settings.

The centralized applications manager 15 in conjunction with the applications handler 5 enables users to list all applications 3 available to them, to list information (in the sense of business data) relating to a particular application 3, to select a particular application 3 and look up its parameter settings (entry of code obligatory or not, application activated, etc.), to consult the list of the latest transactions effected using an application 3, and to set application parameters (modify PIN, activate an application, deactivate an application, activate PIN protection, etc.) In other words, the centralized applications manager 15 can manage, construct, and display a unified view of the applications 3 available on users' mobile terminals.

Moreover, when the applications 3 are executed in the mobile terminal, they render a set of services to the user. Execution of an application 3 can be linked to another application or to a system external to the terminal (for example activation of a Cardlet by a local external reader for a service payment service). Any application 3 installed and operational in the mobile terminal is necessarily known to and registered with the applications handler 5. Thus the applications handler 5 stores any new application in the storage means 9 of the manager system 1 for the applications of the mobile terminal.

Moreover, to provide a particular service, the corresponding application 3 recovers from the applications handler 5 parameters related to that application 3 in order to render a service to the user.

Figure 4:
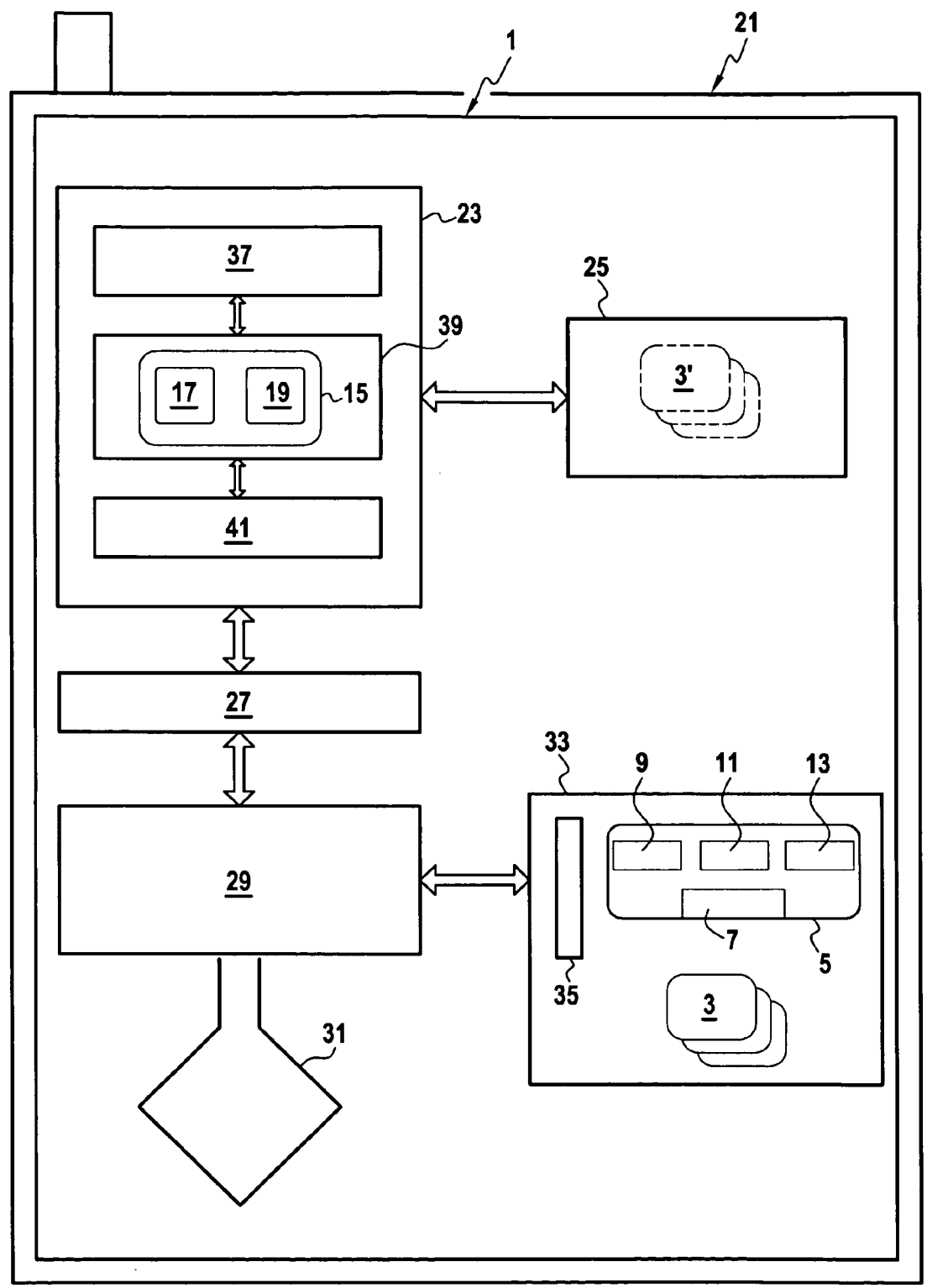
FIG. 4 is a diagram of one particular embodiment of the FIG. 3 management system.

FIG. 4 shows one particular embodiment of the system 1 shown in FIG. 3 for managing applications of a mobile terminal.

This diagram shows a Java mobile terminal 21 including a communication (baseband) module 23 providing the basic functions of the mobile terminal 21, a subscriber identification module (SIM) 25, an adaptation and mapping layers (AML) module 27, a near-field communication (NFC) module 29, an antenna 31, and a Smart MX card component 33.

The Smart MX card component 33 is a smart card controller combining DES (Data Encryption Standard) or RSA (Rivest Shamir Adleman) coprocessors and enabling implementation of operating systems (OS) such as Java Open Platform. It also has ISO 14443 or ISO 7816 interfaces and stores Java Card applications (Cardlet Assistant) and partner applications (Cardlets Partner) and the relevant data. The Smart MX component 33 also includes an open platform operating system 35 based on the JCOP (Java Card Open Platform) standard.

Thus the applications handler 5 corresponds to the Cardlet Assistant and takes the form of a Java Card application 5 also known as a Cardlet which comprises four sub-elements corresponding to the access means 7, the storage means 9, the transaction log 11, and the security module 13. The applications handler 5 is resident in the Smart MX card component 33.

Moreover, the applications 3 correspond to Java Card Java applications known as Cardlets (Cardlets Partner) stored in the Smart MX card component 33.

The communication (baseband) module 23 includes a man-machine interface (MMI) 37 native to the mobile terminal 21, a Java applications module 39, and a Java 2 Micro Edition component 41.

The Java applications module 39 includes a Card Summary Java MIDlet that corresponds to the centralized applications manager 15. Thus, including the graphical user interface 17 and the connector 19, this Java MIDlet offers the user a unified view of the applications (Cardlets) 3.

The Java 2 Micro Edition component 41 comprises all the elements necessary for executing Java MIDlets in the mobile terminal 21. Thus it comprises a virtual machine and the application programming interfaces (API) necessary for executing MIDlets and the API for dialogue with the subscriber identification module (SIM) card 25, the Java applications 3 available on the Smart MX card component 33 or the near-field communication (NFC) module 29 of the mobile terminal 21.

The adaptation and mapping layers (AML) module 27 comprises various abstraction, adaptation, and mapping layers enabling communication between the communication (baseband) module 23 and in particular the MIDlets, the Smart MX card component 33, and the near-field communication (NFC) module 29 of the mobile terminal 21.

The near-field communication module 29 enables near-field communication via the antenna 31 between the mobile terminal 21 and an external reader or an RFID (radio-frequency identification) tag. The near-field communication module 29 also enables communication between the centralized applications manager 15 (Card Summary) and the applications handler 5 (Cardlet Assistants) and the applications 3 (Cardlet Partners).

Where appropriate, the subscriber identification module (SIM) card 25 can contain Cardlet applications 3' (represented in dashed line).

The management system 1 includes one or more computer programs including code instructions for executing the management method of the invention when executed by the various elements of the system 1 for managing applications in a mobile terminal.

FIGS. 5 to 13 are dynamic diagrams explaining the interworking of the various elements of the system 1 of the invention for managing applications in a mobile terminal.

Figure 5:
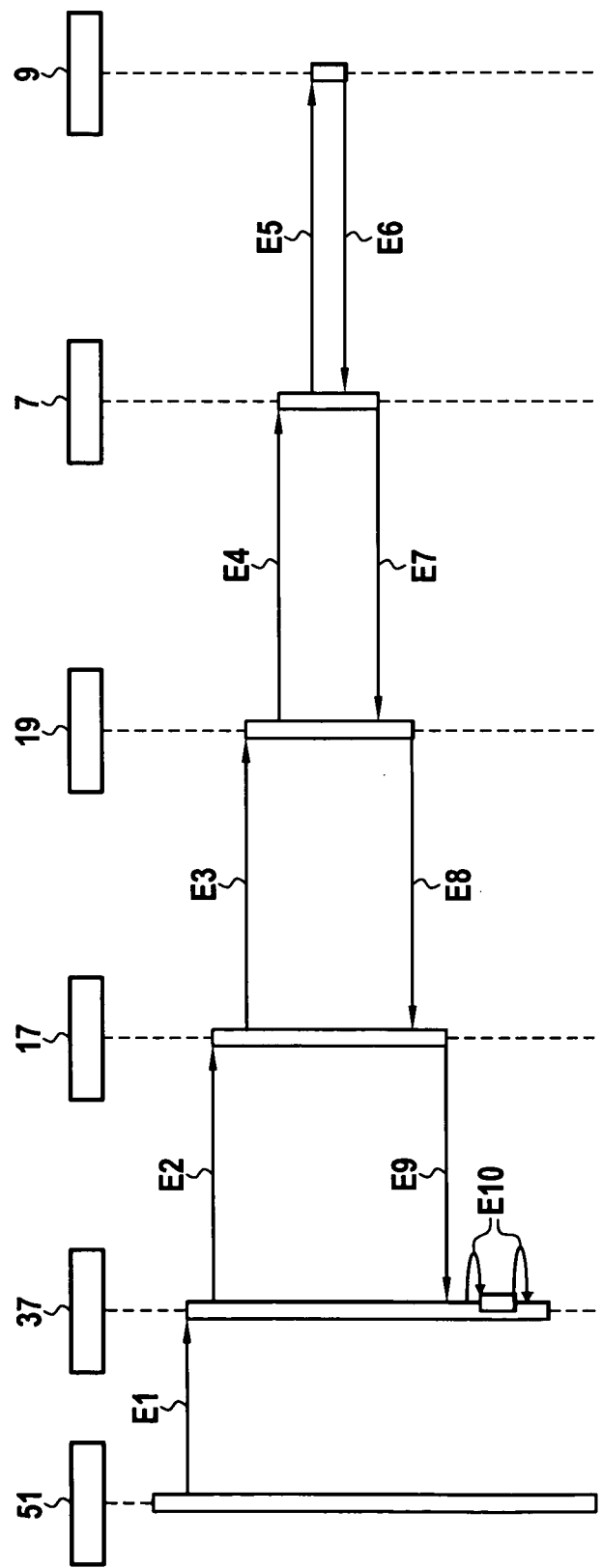
FIGS. 5 to 13 are dynamic diagrams explaining the interworking of the various elements of the mobile terminal management system of the invention.

FIG. 5 shows the user 51 launching or activating the centralized applications manager 15 via the man-machine interface (MMI) of the mobile terminal 21 (steps E1, E2). The management application is then launched via the graphical user interface 17, which calls up a list of applications 3 available or installed in the mobile terminal 21 from the access means 7 of the applications handler 5 via the connector 19 (steps E3, E4). To this end the access means 7 of the applications handler 5 address the storage means 9 (step E5). In return, the man-machine interface 37 recovers a list of available applications in the form of a list containing at least the names and indices of the applications (steps E6 to E9). That list is then available on the man-machine interface (step E10).

Figure 6:
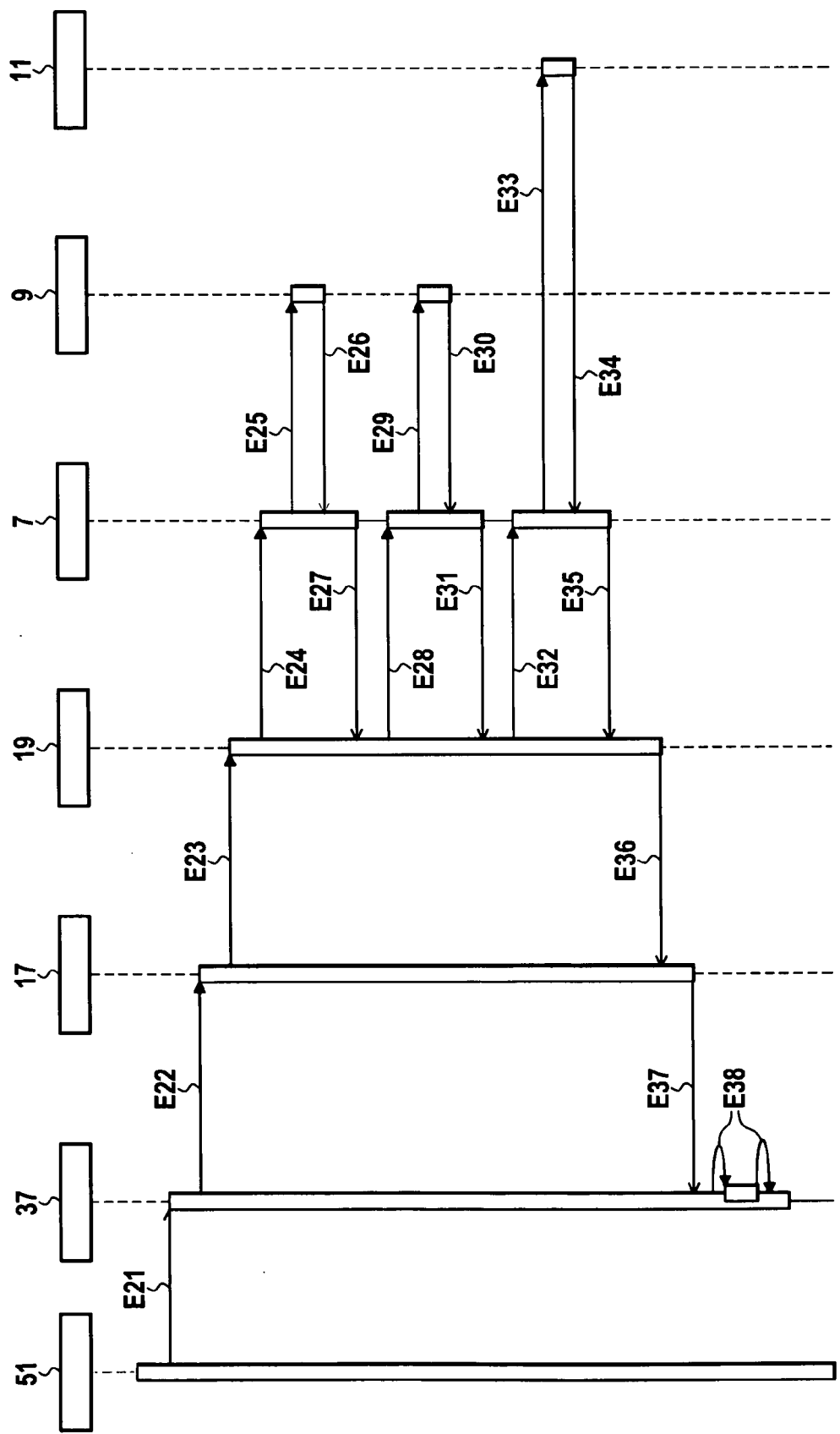

FIG. 6 shows the user 51 selecting a particular application.

Following a request for the selection of a particular application from the user 51 via the man-machine interface 37 (steps E21, E22), the graphical user interface 17 of the centralized applications manager 15 forwards the request to the connector 19 (step E23) which then recovers via the access means 7 of the applications handler 5:

- the activation state of the application 3; this activation state (activated/deactivated) is recovered from the storage means 9 (steps E24 to E27);
- the activation state of the code protection (e.g. PIN protection) of the application 3; this information is also recovered from the storage means 9 (steps E28 to E31);
- a list of the latest transactions for the application 3, recovered from the transaction log 11 (steps E32 to E35).

The connector forwards all this information to the graphical user interface 17 (step E36), which forwards it to the man-machine interface 37 (step E37), where the information, including the list of the latest transactions, the activation state and PIN protection state corresponding to the application are displayed on the man-machine interface 37 (step E37).

To optimize the access and processing time for future operations, some or all of this information can be stored in the connector 19. Under such circumstances, subsequent invoking of the access means 7 of the applications handler 5 is no longer systematic.

Figure 7:
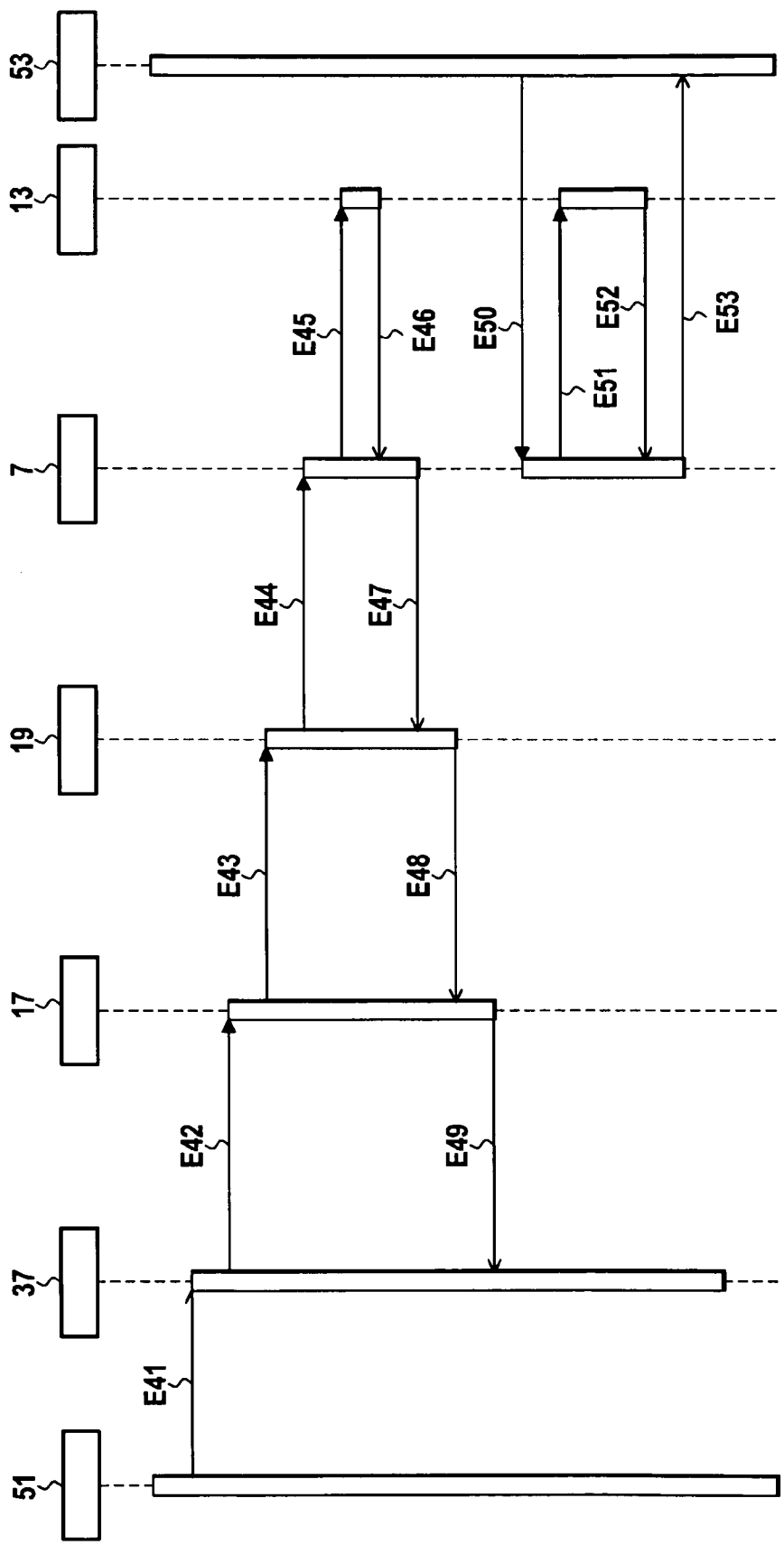

FIG. 7 shows verifying security parameters.

If a security code (e.g. a PIN) is required, the user 51 enters their PIN via the man-machine interface 37 (step E41). This PIN is then forwarded to the access means 7 of the applications handler 5 via the centralized applications manager 15 including the graphical user interface 17 and the connector 19 (steps E42 to E44). The verification is effected by the security module 13 (step E45), which, in the event of an error, increments a counter that counts the number of consecutive incorrect PINs. The security module 13 forwards the verification state (true/false) to the man-machine interface 37 via the access means 7, the connector 19, and the graphical user interface 17 (steps E46 to E49).

If the number of incorrect PIN attempts is reached, the application 3 and the PIN are blocked. Unblocking can be effected only by a human operator. Only an external security system 53 can unblock (PUK) the PIN (step E50) in the access means 7 of the applications handler 5. Note that any failure during this phase permanently blocks the PIN. In the step E51, the access means 7 forward the unblocking code to the security module 13 that effects the verification and, in the event of a positive verification result, unblocks the PIN; it then forwards the verification state (true/false) to the access means 7 (step E52) which in turn forward it (step E55) to the external security system 53.

Figure 8:
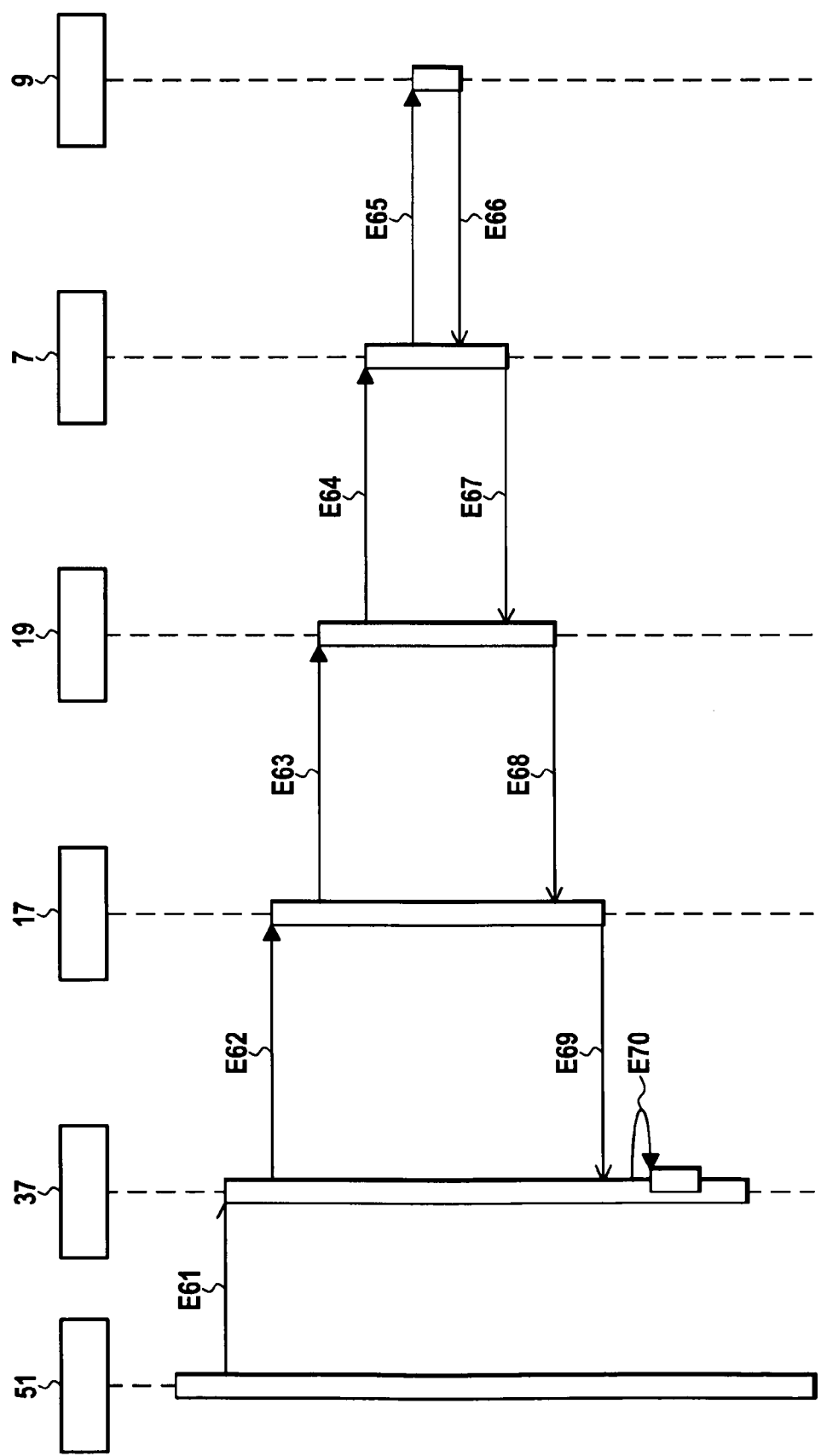

FIG. 8 shows the user 51 requesting a list of applications available in the mobile terminal 21. The user or any other authorized external system can request a list of applications available in the mobile terminal.

In this example, the user 51 requests a list of applications from the man-machine interface 37 of the mobile terminal 21 (steps E61, E62). This operation can equally be effected by the graphical user interface 17, to update or "refresh" the existing list. For this purpose the graphical user interface 17 calls up a list of applications 3 available or installed in the mobile terminal 21 from the access means 7 via the connector 19 (steps E63, E64). The access means 7 call on the storage means 9 (steps E65). In return, the man-machine interface 37 recovers a list of available applications in the form of a list containing at least the names and indices of those applications (steps E66, E69). That list is then available at the man-machine interface 37 (step E70).

Figure 9:
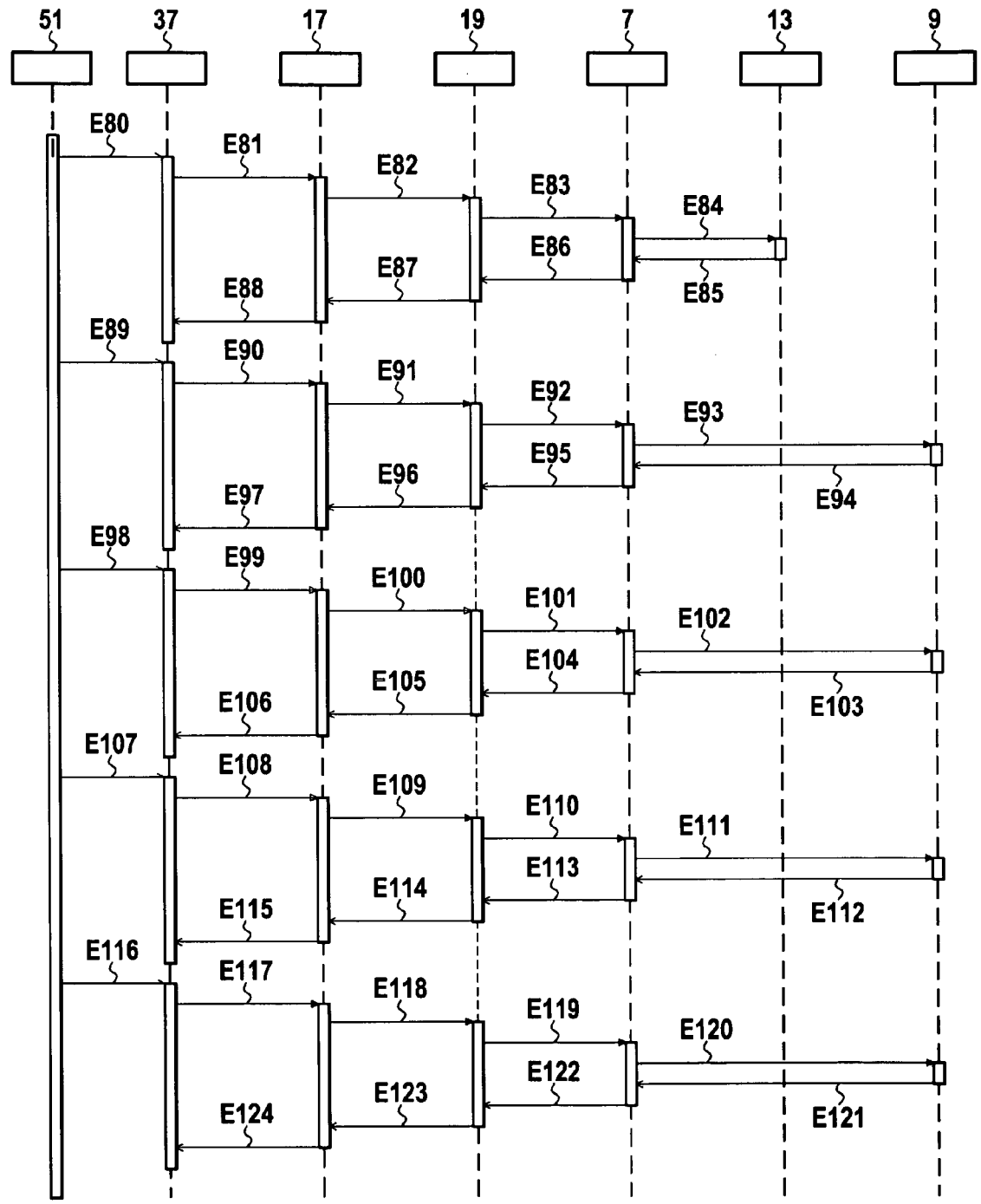

FIG. 9 shows updating application parameters. Updating can be effected for parameters specific to one application or globally for all applications (e.g. the PIN if all applications use the same PIN).

Steps E80 to E88 modify the PIN, which can relate to one application or to all applications.

When modifying the PIN for a particular application 3, the user 51 sends the identifier of the application via the man-machine interface 37 at the same time as the old and new PINs (step E80). A PIN must be verified before updating it (globally or otherwise).

Following the request by the user 51 to change the PIN, the graphical user interface 17 receives the message from the man-machine interface 37 (step E81) and forwards to the access means 7 of the applications handler 5 via the connector 19 (steps E82, E83) the new PIN, the old PIN, and, when updating the PIN of an application, the identifier of that application. The security module 13 receives the message (step E84) and then verifies the validity of the PIN on the basis of the old PIN and then, with a positive result, proceeds to update the PIN using the new PIN that has been sent. The result of modifying the PIN (yes/no) is sent via the security module 13 to the man-machine interface 37 via the elements 7, 19, and 17, respectively (steps E85 to E88).

The steps E89 to E97 activate an application.

Following a request by the user 51 via the man-machine interface 37 to activate an application (step E89), the graphical user interface 17 receives the message from the man-machine interface 37 (step E90) and sends the access means 7 of the applications handler 5, via the connector 19, an identifier of the application and an activation variable set to true (steps E91, E92). If the application had been deactivated, its activation is then stored in the storage means 9 (step E93). If not an error message is sent back for display on the man-machine interface 37 of the mobile terminal. In any event, the storage means 9 send the activation result (true/false) to the man-machine interface 37 via the elements 7, 19, and 17, respectively (steps E94 to E97).

The steps E98 to E106 deactivate an application.

Following a request for deactivation of an application 3 from the user 51 via the man-machine interface 37 (step E98), the graphical user interface 17 receives the message from the man-machine interface 37 (step E99) and sends the access means 7 of the applications handler 5 via the connector 19 (steps E100, E101) an identifier of the application and an activation variable set to false. If the application had been activated, its deactivation is then stored in the storage means 9 (step E102). If not, an error is sent back for display on the man-machine interface 37 of the mobile terminal. In any event, the storage means 9 send the deactivation result (true/false) to the man-machine interface 37 via the elements 7, 19, and 17, respectively (steps E103 to E106).

Steps E107 to E115 activate security code protection.

Following a request to activate an application, a list of applications or all applications from the user 51 via the man-machine interface 37 (step E107), the graphical user interface 17 receives the message from the man-machine interface 37 (step E108) and sends the activation request via the connector 19 to the access means 7 of the applications handler 5 (steps E109, E110). The absence of parameters indicates that the activation applies to all applications. The request to activate one or more applications contains a list of applications to be protected. In both situations, the request contains a protection activation variable set to true. The request is then processed by the storage means 9 (step E111) which verifies the possibility of activation (function already activated, non-existing application, etc.) before execution. The storage means 9 send the activation result (true/false) to the man-machine interface 37 via the elements 7, 19, and 17, respectively (steps E112 to E115).

Steps E116 to E124 deactivate security code protection.

Following a request from the user 51 via the man-machine interface 37 for deactivation of an application, a list of applications or all applications (step E116), the graphical user interface 17 receives the message from the man-machine interface 37 (step E117) and forwards the deactivation request via the connector 19 to the access means 7 of the applications handler 5 (steps E118, E119). The absence of parameters indicates that the activation applies to all the applications. The deactivation request for one or more applications contains a list of applications that are no longer to be protected. In both situations, the request contains a protection activation variable set to false. The request is then processed by the storage means 9 (step E120), which verify if activation is possible (function already deactivated, non-existing application, etc.) before execution. The storage means 9 send the deactivation result (true/false) to the man-machine interface 37 via the elements 7, 19, and 17, respectively (steps E121 to E124).

Figure 10:
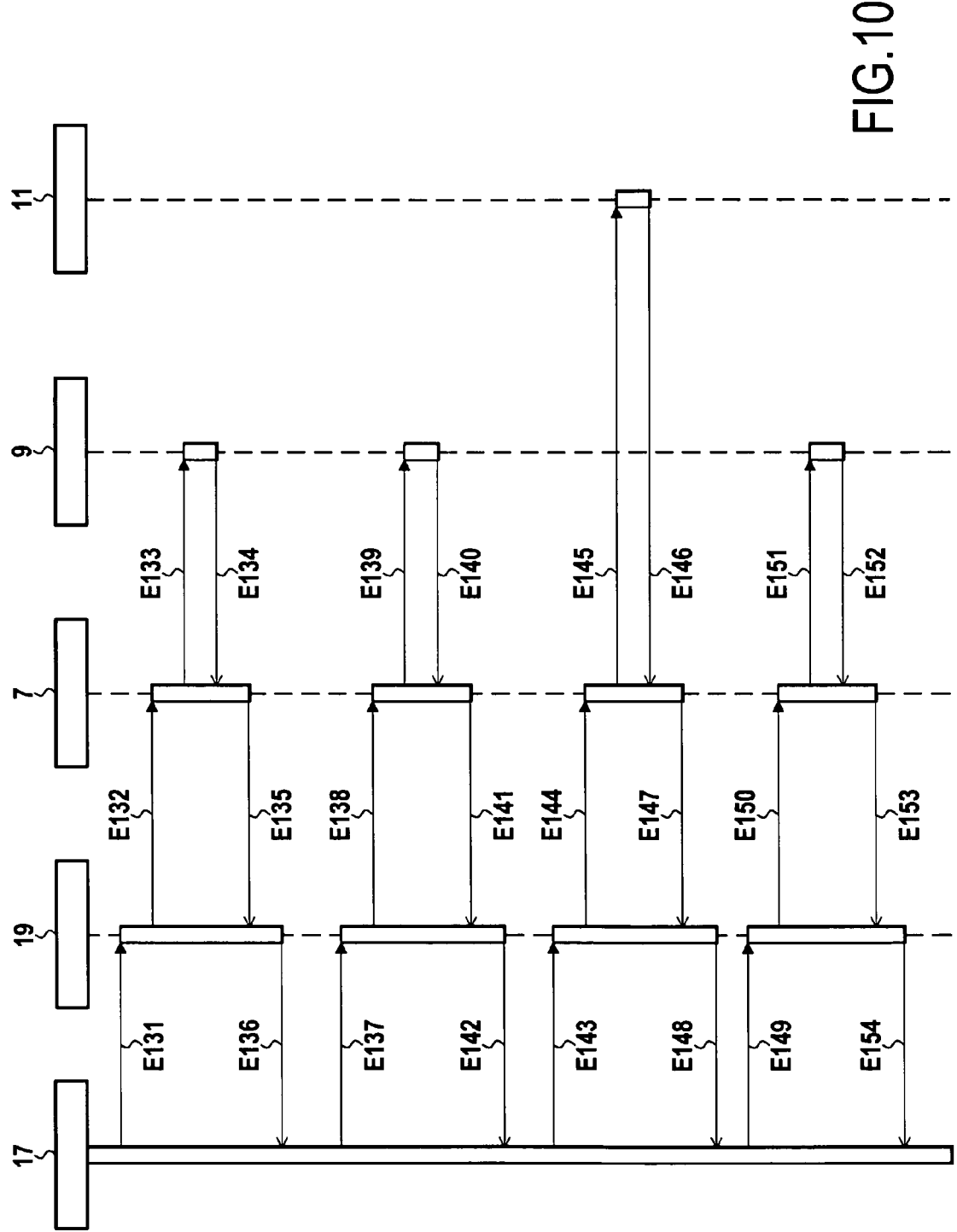

FIG. 10 shows recovering application parameters. This diagram shows that it is possible to recover the parameters of an application 3 or all data relating to one application 3 or to all applications 3 of the user. The parameters and data are those contained in the storage means 9, the transaction log 11 or the security module 13.

Steps E131 to E136 recover the activation state of an application. The graphical user interface 17 recovers the activation state of an application based on its identifier or its index from the access means 7 of the applications handler 5 via the connector 19. The request is processed by the storage means 9, which send back the activation state (activated/deactivated) of the application.

Thus the graphical user interface 17 sends this request via the connector 19 to the access means 7 of the applications handler 5 (steps E131, E132). The request is then processed by the storage means 9 (step E133) which sends the activation state (activated/deactivated) to the graphical user interface 17 via the elements 7 and 19, respectively (steps E134 to E136).

Steps E137 to E142 recover the code protection state of the application. The graphical user interface 17 recovers from the access means 7 of the applications handler 5 via the connector 19 the code (e.g. PIN) protection state of an application based on its identifier or its index. The request is processed by the storage means 9, which send back the code (e.g. PIN) protection state (activated/deactivated) of the application.

Thus the graphical user interface 17 sends this request via the connector 19 to the access means 7 of the applications handler 5 (steps E137, E138). The request is then processed by the storage means 9 (step E139) which sends the activation state (activated/deactivated) to the graphical user interface 17 via the elements 7 and 19, respectively (steps E140 to E142).

Steps E143 to E148 recover a list of the transactions of an application 3 on the basis of its name or its index. Thus the graphical user interface 17 sends this request via the connector 19 to the access means 7 of the applications handler 5 (steps E143, E144). The request is processed by the transaction log 11 (step E145), which then sends the list of the latest transactions for the application to the graphical user interface 17 via the elements 7 and 19, respectively (steps E146 to E148).

Steps E149 to E154 recover the identifier of an application 3. Thus the graphical user interface 17 sends this request via the connector 19 to the access means 7 of the applications handler 5 (steps E149, E150). The request is processed by the storage means 9 (step E151), which then sends the unique identifier of the application to the graphical user interface 17 via the elements 7 and 19, respectively (steps E152 to E154).

Figure 11:
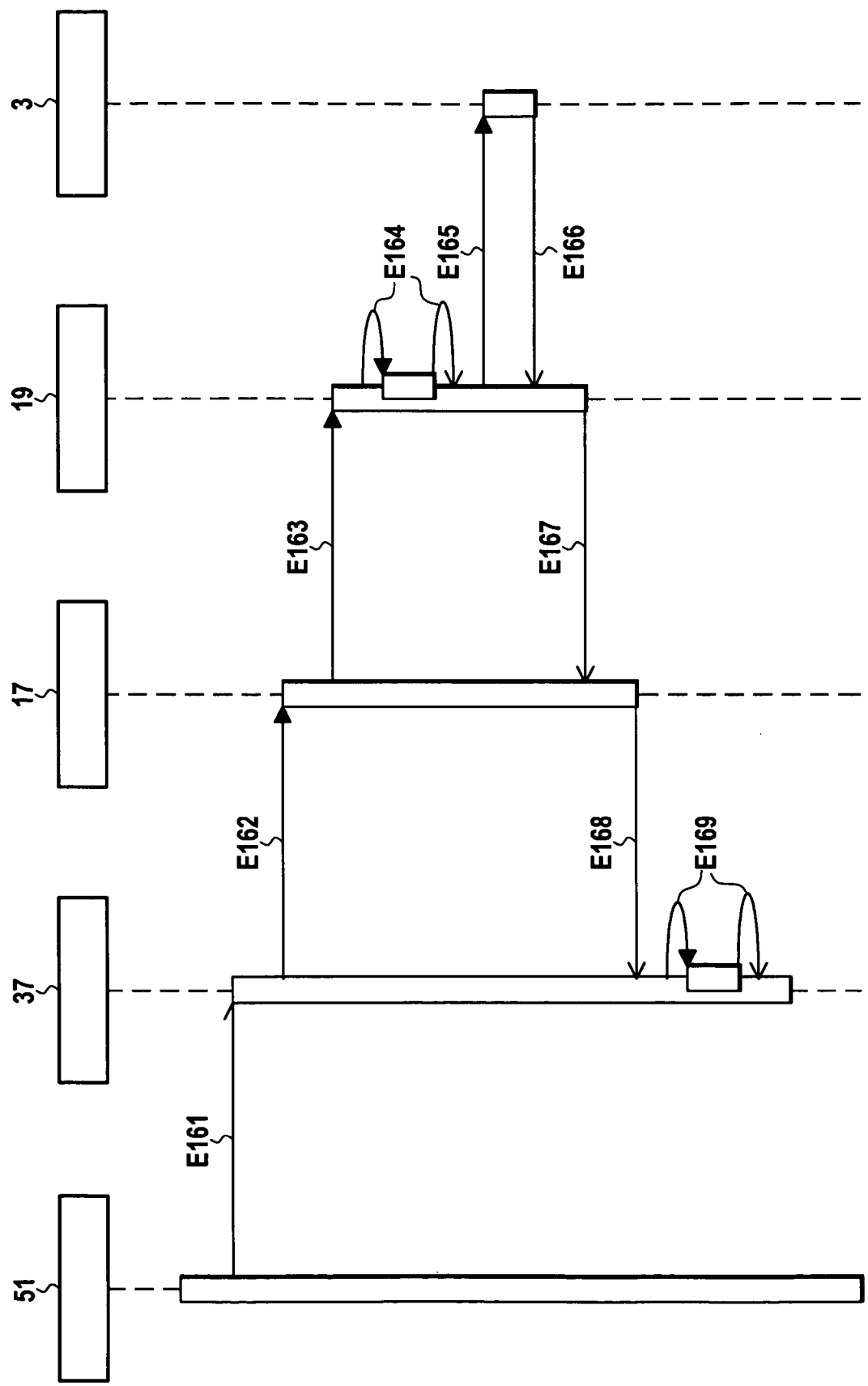

FIG. 11 shows recovering business data of an application, such as the identifier of the client, the validity date of the application, the available credit, the type of subscription, etc. This data is managed by the application 3 itself, unlike the parameters of the application, which are managed in the storage means 9, the transaction log 11 or the security module 13. For this request the application 3 is invoked directly, not the applications handler 5.

Following a request from the user via the man-machine interface 37 for display of the business data related to an application 3 (steps E161, E162), the graphical user interface 17 recovers, on the basis of the identifier of the application, a list of this data directly from the application 3 via the connector 19 of the centralized applications manager 15 (steps E163 to E167). The application 3 must first have been selected by the connector 19 (steps E164). If the application does not exist (non-existent identifier) an "unknown application" message can be displayed on the man-machine interface 37.

Alternatively, business data of an application 3 can be recovered via the access means 7 of the applications handler 5.

Figure 12:
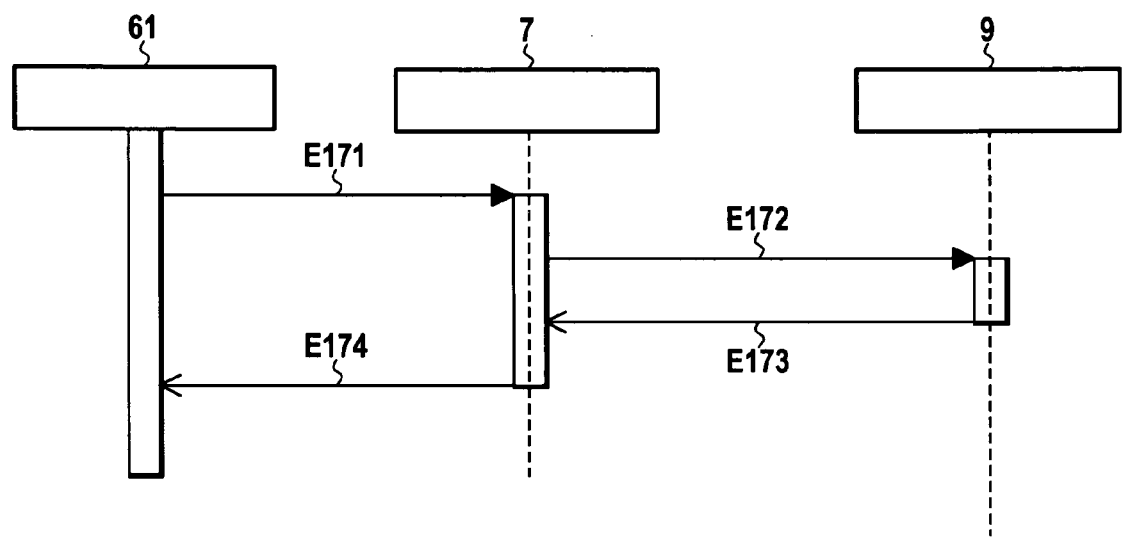

FIG. 12 shows storing an application in the mobile terminal. Following successful downloading of an application 3 into the mobile terminal, the element or application 61 (e.g. a Java MIDlet) responsible for downloading stores the application 3 with the common access means 7 of the applications handler 5 (step E171), which then stores the application 3 with the storage means 9 (step E172). Steps E173 and E174 indicate if storage has succeeded (yes/no). This storage therefore offers the user a unified view of their applications.

Figure 13:
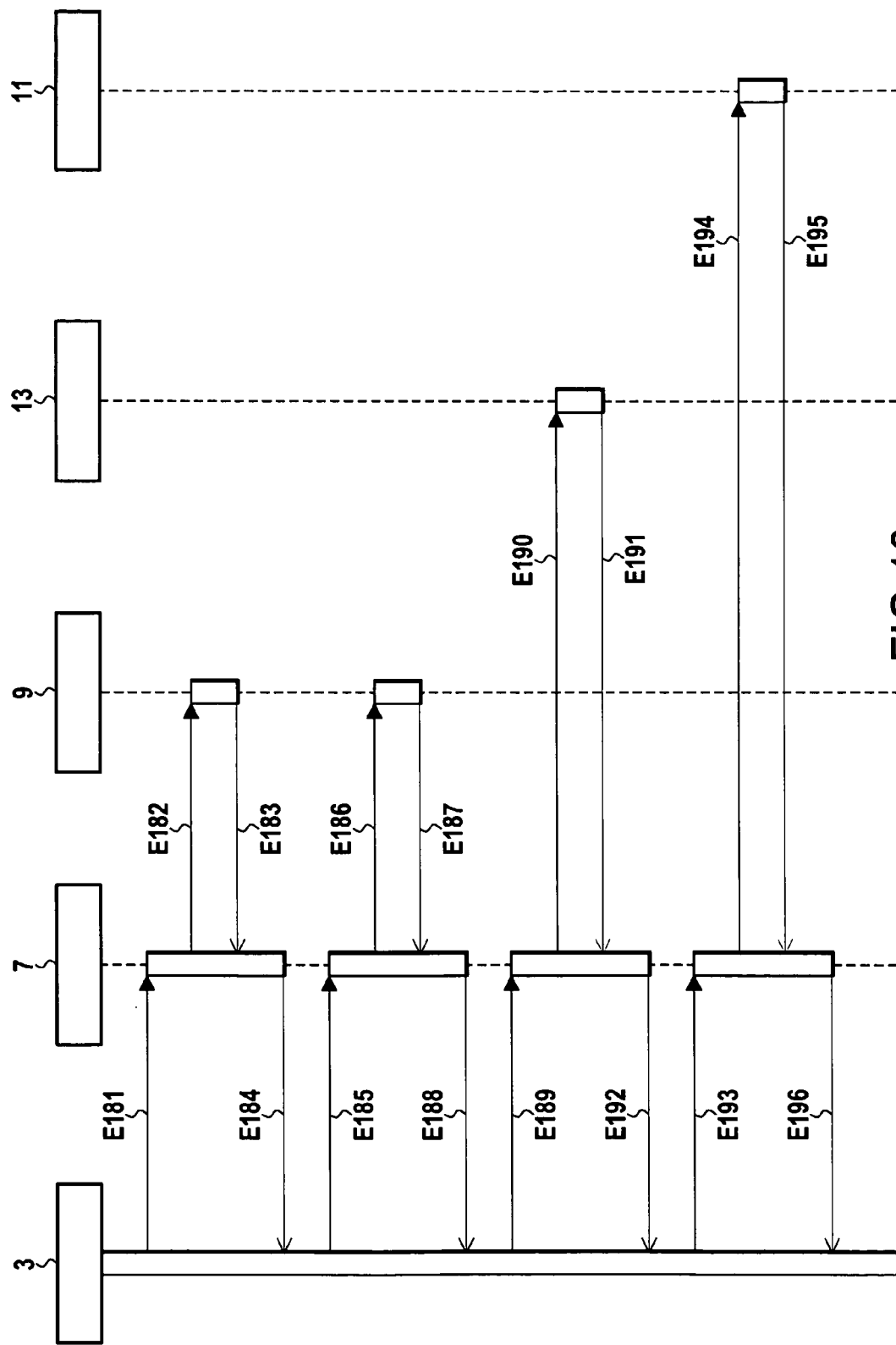

FIG. 13 shows the use of an application. When providing a service to a user, applications call on the applications handler 5 to recover information on their parameter settings. At the end of providing a service, the applications handler 5 is also called to store the transaction.

Steps E181 to E184 read the activation flag of the application 3. Prior to any use of a service, reading the application flag (step E181) determines if the application 3 associated with the service in the user's mobile terminal is activated or not. Accordingly, the access means 7 of the applications handler 5 consult the storage means 9 holding that information (step E182). The storage means 9 send the activation state (true/false) to the application 3 (steps E183, E184).

Steps E185 to E188 read the PIN activation flag. Prior to use of a service, reading the PIN activation flag (step E185) determines if a PIN verification phase is required. Thus the access means 7 of the applications handler 5 consult the storage means 9 holding that information (step E186). The storage means 9 send the PIN activation state (true/false) to the application 3 (steps E187, E188).

Steps E189 to E192 recover the PIN (step E189) that enables an authorized application to recover the PIN of the user for the application concerned. Thus the access means 7 of the applications handler 5 consult the security module 13 holding that information (step E190). The security module 13 sends the requested PIN to the application 3 (steps E191, E192).

Steps E193 to E196 store a transaction. At the end of provision of a service, the application 3 stores the transaction in the transaction log 11 via the access means 7 of the applications handler 5 (steps E193, E194). During this phase, the application 3 specifies its identifier (or its index) and information constituting the transaction. That information preferably includes the identifier of the user, the transaction type, the transaction state (yes/no), the time of day supplied by the application, the duration and if necessary the amount.

The invention claimed is:

1. A system for managing a set of applications, the system including a mobile terminal and at least one card in which the set of applications is stored, wherein the card includes an applications handler adapted to manage said set of applications and store an application activation flag for each application of the set, and the mobile terminal includes centralized management means adapted to communicate with the applications handler of the card to exchange information relating to said set of applications of the card and to enable a user of the terminal to modify a value of said flag for each application of the set, wherein the applications handler of the card further includes a transaction log for storing information relating to transactions effected by said set of applications, and wherein each application of the set of applications calls the applications handler when providing a service to the user to receive the flag from the applications handler, each said application proceeding to provide the service only if said value indicates that the application is activated.

2. The system according to claim 1, wherein the applications handler of the card further stores information relating to said set of applications.

3. The system according to claim 1, wherein the centralized management means of the terminal comprises:
graphical user interface; and
connection means for exchanging information relating to said set of applications between the graphical user interface and the applications handler of the card.

4. A card comprising a set of applications, and comprising an applications handler adapted to exchange information relating to said set of applications with a centralized management means of a mobile terminal and store an application activation flag for each application of the set, wherein the applications handler further includes a transaction log for storing information relating to transactions effected by said set of applications, and wherein each application of the set calls the applications handler when providing a service to the user to receive a value of the flag from the applications handler, each said application proceeding to provide the service only if said value indicates that the application is activated.

5. The card according to claim 4, wherein the applications handler stores information relating to said applications and, based on this information, a centralized application manager is configured to display a unified view with a list of all applications in the card and associated parameter settings.

6. The card according to claim 4, wherein the applications handler further includes a security module for administering security data relating to said applications.

7. A system comprising:
an applications handler adapted to store respective application activation flags for applications of a set of applications for a mobile terminal user, wherein the applications handler, when called by an application of the set, sends to said calling application the value of the respective application activation flag prior to providing by the application of an associated service to the mobile terminal user, said providing being performed only if said value indicates that the application is activated; and
a centralized management user interface adapted to enable the mobile terminal user to modify the value of said application activation flag for each application of the set of applications.

8. The mobile terminal according to claim 7, wherein the applications handler stores information relating to applications of the set of applications and, based on this information, a centralized application manager is configured to display a unified view with a list of all applications in the card and associated parameter settings.

9. A system according to claim 7, comprising a smart MX card and a Java mobile terminal, the application handler being included in the smart MX card as a Cardlet Assistant, the applications of the set of applications also being included in the smart MX card as Cardlets Partners, and the centralized management user interface being included in the mobile terminal as a Card Summary java Midlet.

* * * * *